Patented Apr. 17, 1923.

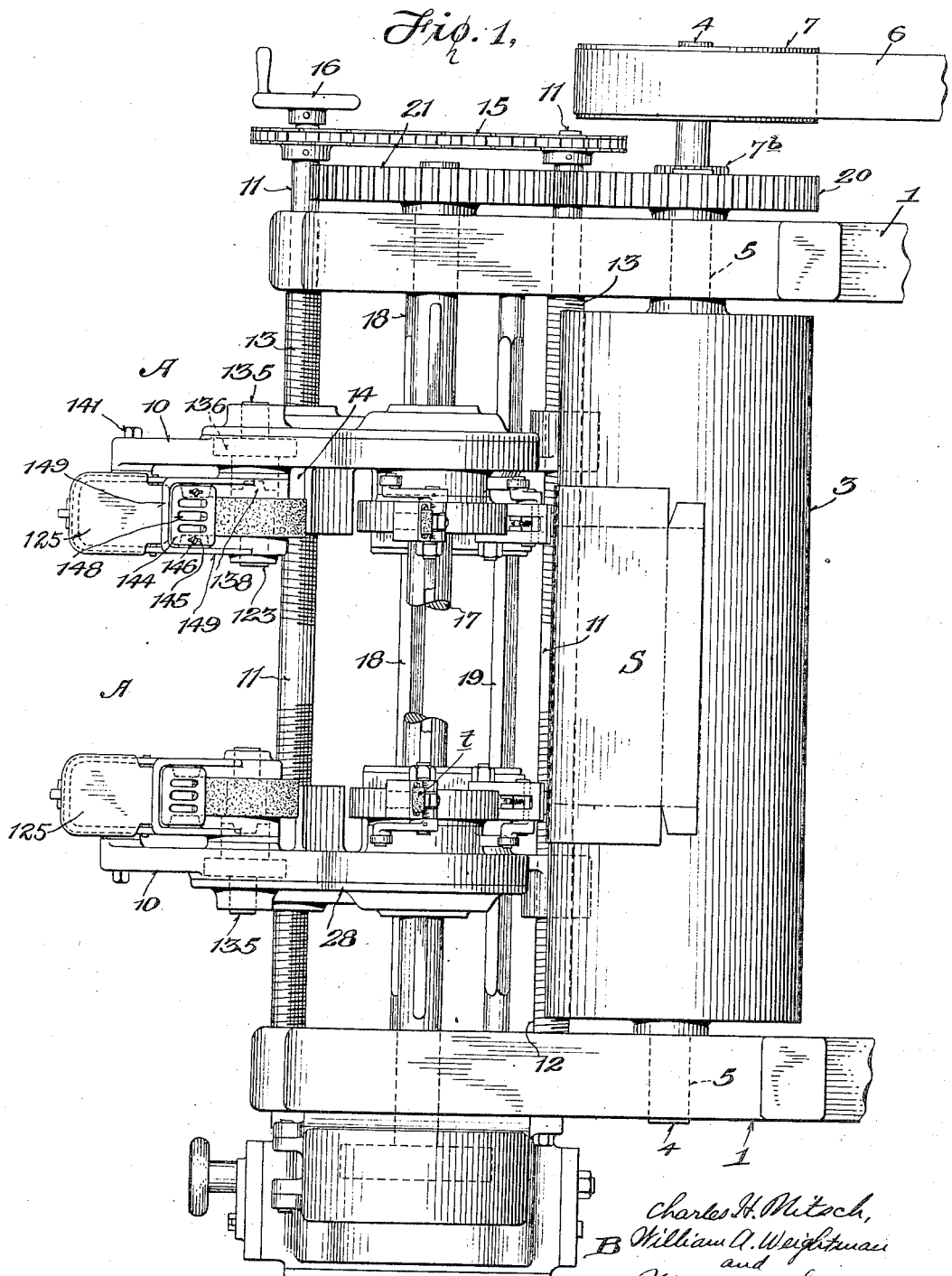

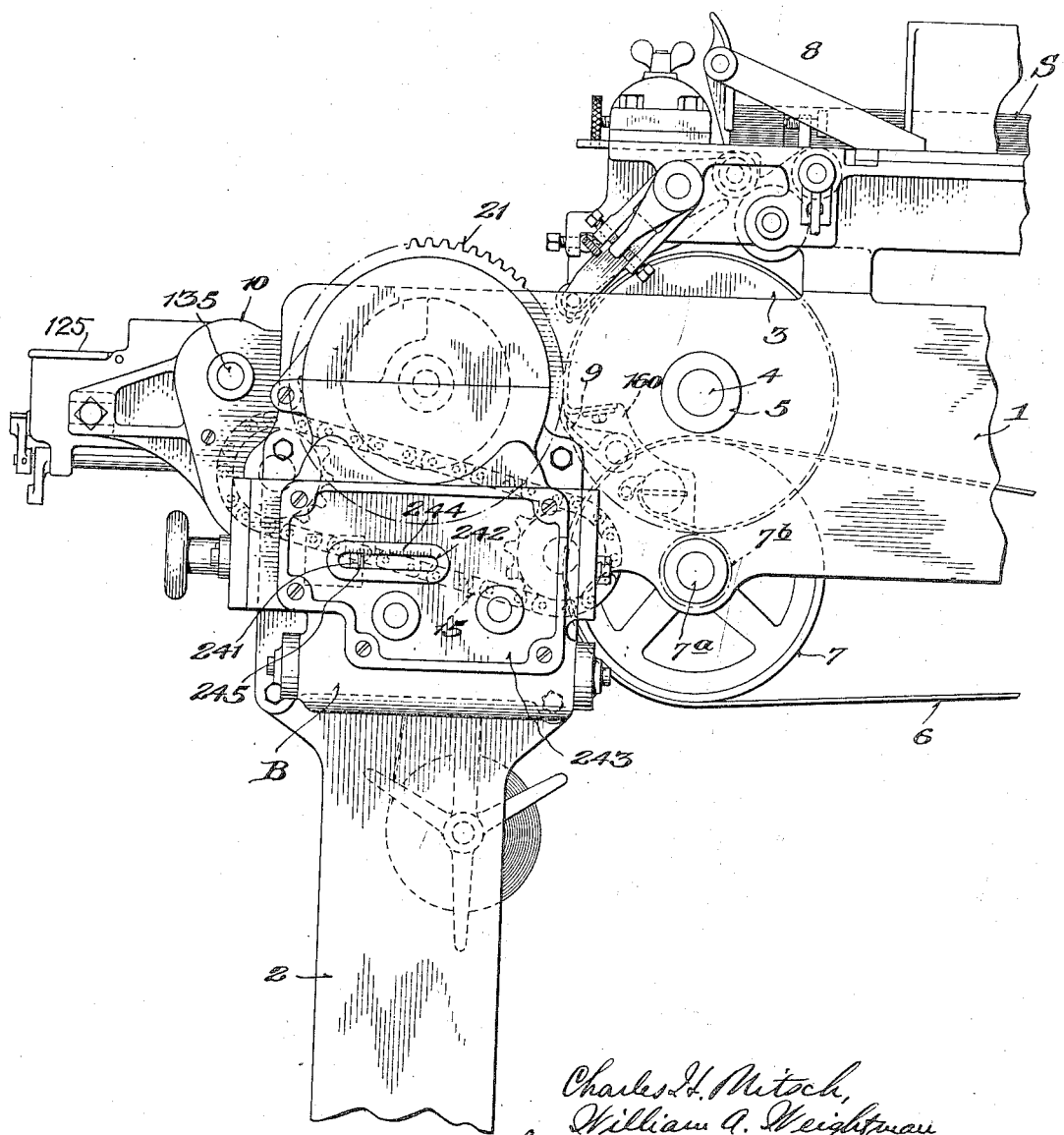

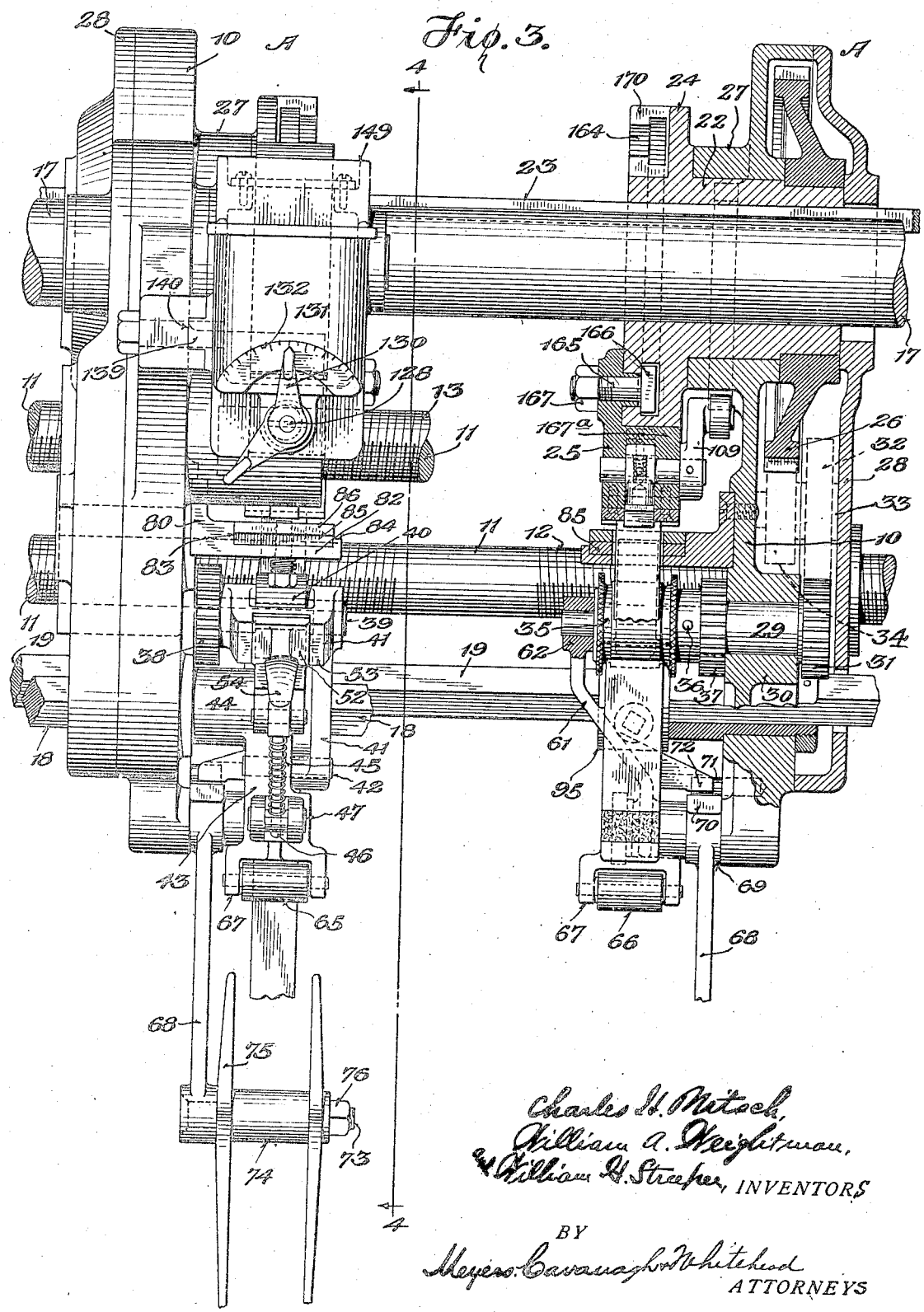

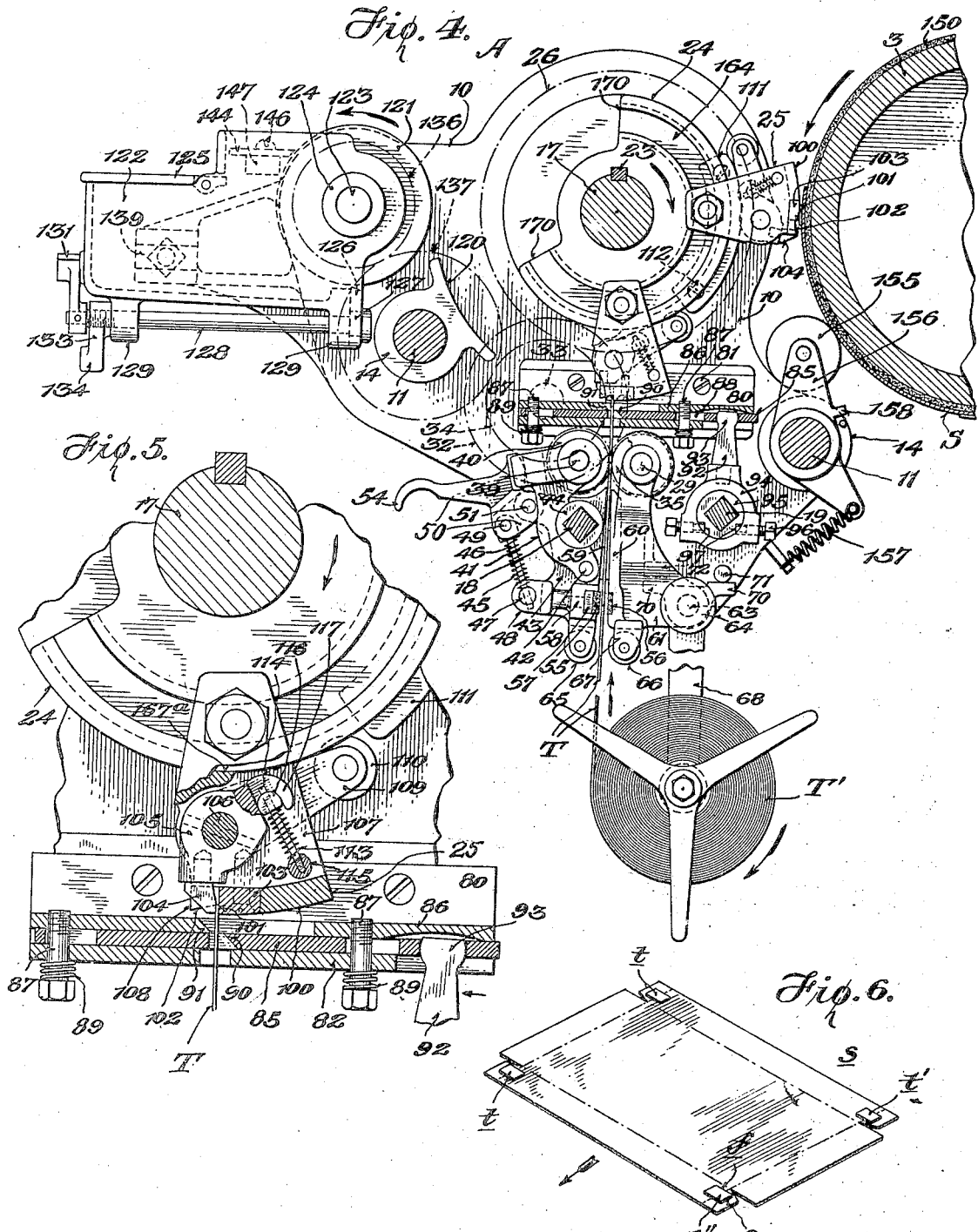

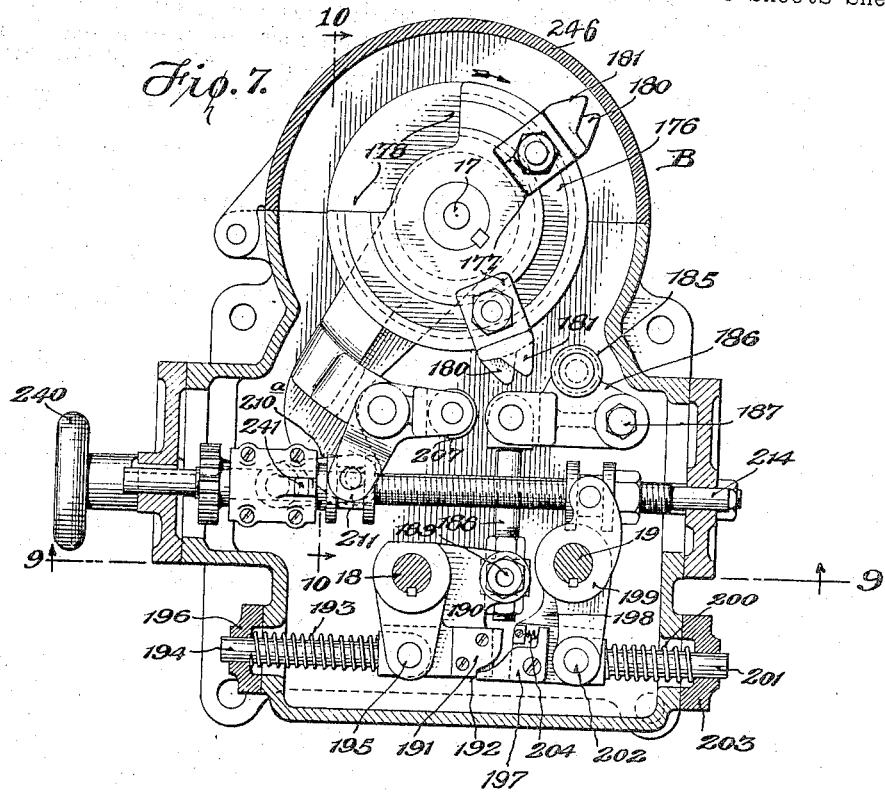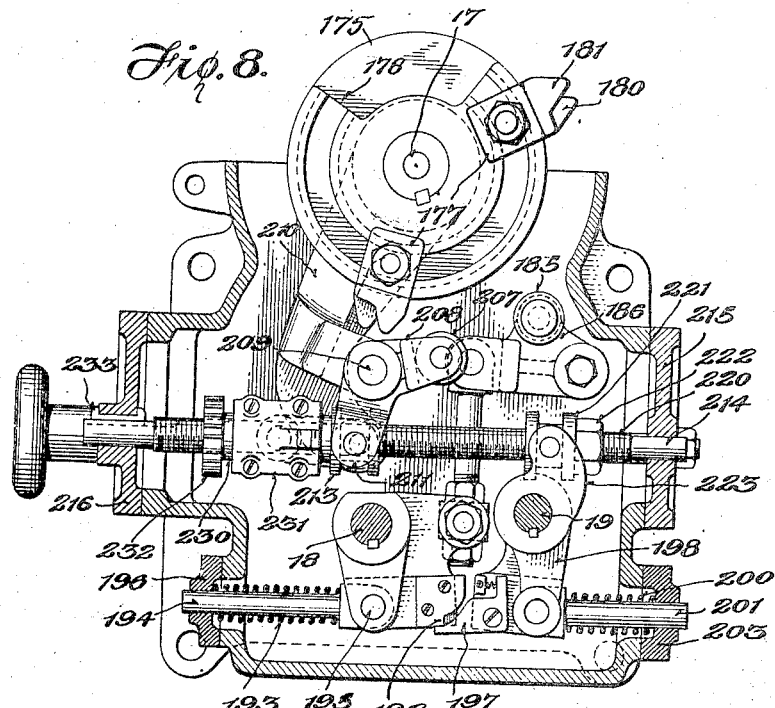

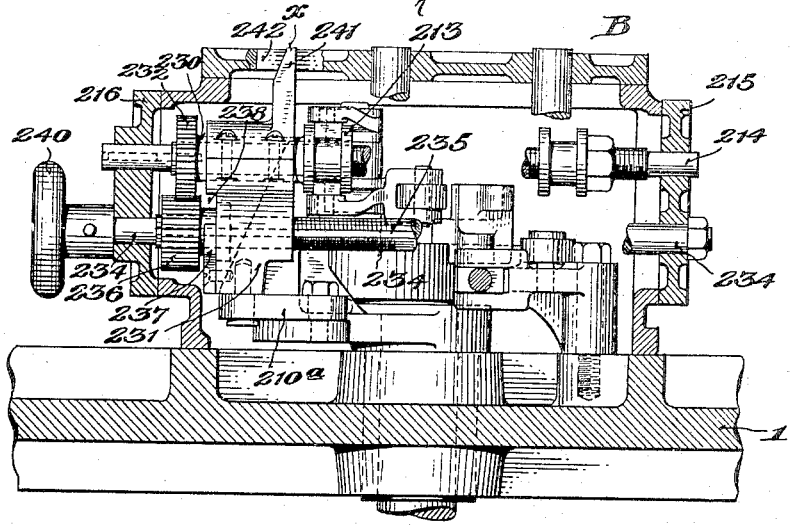
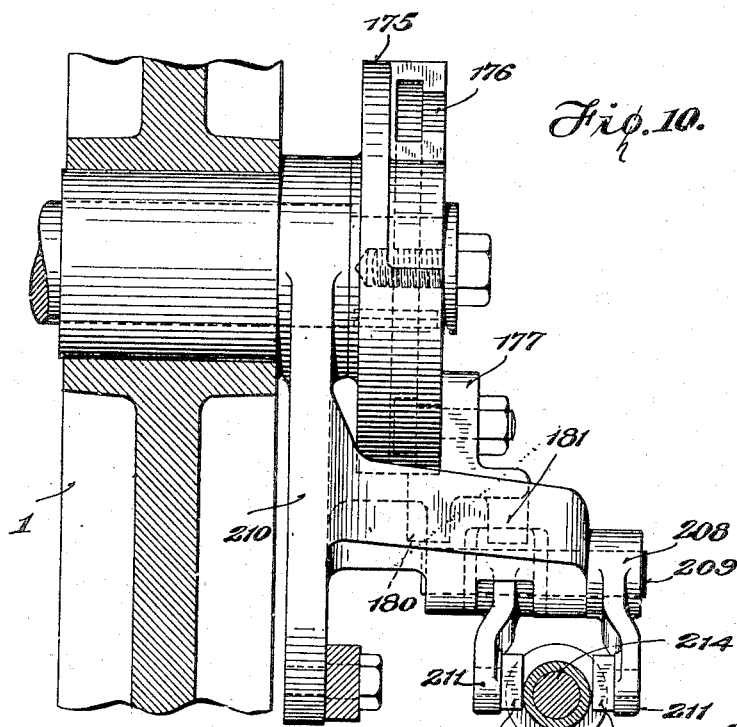

1,451,782

UNITED STATES PATENT OFFICE.

CHARLES H. NITSCH AND WILLIAM A. WEIGHTMAN, OF LOGAN, PHILADELPHIA, AND WILLIAM H. STREEPER, OF FRANKFORD, PHILADELPHIA, PENNSYLVANIA, ASSIGNORS TO STOKES & SMITH COMPANY, OF SUMMERDALE, PHILADELPHIA, PENNSYLVANIA, A CORPORATION OF PENNSYLVANIA.

STAY OR TAB APPLYING MACHINE.

Application filed March 1, 1922. Serial No. 540,290.

*To all whom it may concern:*

Be it known that we, CHARLES H. NITSCH, WILLIAM A. WEIGHTMAN, and WILLIAM H. STREEPER, citizens of the United States, said NITSCH and WEIGHTMAN being residents of Logan, Philadelphia, and said STREEPER a resident of Frankford, Philadelphia, in the county of Philadelphia and State of Pennsylvania, have invented certain new and useful Improvements in Stay or Tab Applying Machines, of which the following is a specification.

This invention relates to machines especially adapted for applying stay-tabs to box part cover blanks, of the general type disclosed in the patent to James D. Reifsnyder and Henry G. Schwerdtle, No. 1,060,026, of April 29, 1913.

A principal object of the invention is to provide means for applying tabs of various lengths, and particularly very short tabs, as well as tabs as long as desired for the purpose in view, with a practically indefinite number of intermediate lengths. This is accomplished by an entirely new organization of the tab-strip feed and cut-off mechanism, which avoids limitations in regard to tab length imposed in the patented machine by the nature of the gear segment and pinion tab-feed mechanism.

Another object is to provide simple and effective adjusting means for regulating tablength, which may be manipulated when the machine is running, as well as when it is still.

Another object is to arrange each tabbing mechanism, that is the mechanism for feeding, cutting off, gripping, gluing and applying tabs to the box-part cover blanks, of which there are usually two such mechanisms in a machine of this class, so that each of such mechanisms is substantially a complete operative unit, and may be adjusted as such for the proper lateral positioning of the tabs; and to provide simple and effective tabbing unit adjusting means to adjust both of the units simultaneously in relation to the blank carrier.

A further object is to revise and improve the construction and operation of a machine of this general type in numerous ways, sufficiently pointed out hereafter.

The accompanying drawings show one exemplifying machine embodying the invention. This machine is especially adapted for applying staying tabs to box part cover blanks in the same general manner and for the purposes fully described in the above mentioned patent, to which reference should be made for an understanding of general conditions in this class of box manufacture. It will be evident, however, that the machine hereafter described in detail, in all or some of its features or in its proper adaptations within the scope of the present invention, is capable of use for applying strips or tabs of material to blanks or sheets of material for other purposes, where some or all of the conditions are similar, and we contemplate the employment of any structures which are properly within the scope of the appended claims.

In the drawings:

Fig. 1 is a top plan of tabbing mechanism embodying the invention, shown in connection with a rotary blank platen for presenting box part cover blanks for tabbing.

Fig. 2 is a side elevation of the same.

Fig. 3 is an enlarged view from the left of Fig. 1, partly in elevation and partly in section, showing principally the two unitary tabbing mechanisms.

Fig. 4 is a vertical, longitudinal section in the approximate plane 4—4, Fig. 3.

Fig. 5 is an enlarged sectional detail showing mainly a tab gripper and applying head, cut-off mechanism and adjacent parts.

Fig. 6 is a perspective view of one typical form of box cover blank with tabs applied to it in accordance with the usual mode of operation of the machine.

Fig. 7 is a vertical longitudinal section through a housing which may be identified as a "control box," showing the tab-feed and cut-off controlling or regulating and adjusting mechanism.

Fig. 8 is a similar view showing the parts in another adjusted position.

Fig. 9 is a horizontal section in approximately the plane 9—9, Fig. 7, that is, looking from below at the timing mechanism, with certain parts removed and others in section.

Fig. 10 is an enlarged detail of the timing or regulating mechanism.

Figs. 1 and 2 show one end of a frame comprising side members, 1, properly spaced apart by cross pieces (not shown), and legs 2. A sheet or blank platen 3 is carried by a shaft 4 having bearings at 5. This shaft is driven by suitable means, such as a belt 6 and pulley 7, on a shaft 7ª, connected by a pinion 7ᵇ to a gear 20 on shaft 4. Suitable mechanism 8 is provided for feeding sheets S singly and successively to the platen, and the platen has suitable grippers 9 and gripper operating mechanism for seizing the forward edge of the sheet, and for releasing the sheet after tabbing.

The sheet S to be tabbed is in the present instance a box-part covering blank, and it is to be supplied with one or more tabs $t$, usually four, as shown, which act as corner stays or reinforcements of a box part (body or top) when the tabbed blank is subsequently gummed and applied. Conditions relating to this particular class of tabbing are sufficiently further described in the above-mentioned patent. Adjustably mounted adjacent to the platen are one, or usually two tabbing mechanisms A, to correspond to the desired placing of at least one, and usually two, tabs in properly spaced relation near each side of the blank. Although not necessarily so in a broader aspect of the invention, it is desirable for many reasons to arrange each tabbing mechanism A as a substantially self-contained operative unit, one reason for this being that all the various subordinate parts requiring lateral adjustment may in this way be adjusted at once, and very easily and quickly. For this purpose, each tabbing mechanism is built upon and about a plate or frame 10, Figs. 1 and 3.

These plates are partly or entirely supported on transverse screw shafts 11 having bearings in the side frame members, each shaft having "right" and "left" threaded portions 12 and 13, engaging threaded sleeves 14 formed in the plates (Fig. 4). The shafts are connected to rotate in the same direction by sprockets and a chain 15 and one of them is provided with a crank or hand wheel 16. By turning the hand wheel the two tabbing units are adjusted simultaneously laterally and equally in relation to a center line, which is the centered position of the blank on the platen. In this way the tab applying members are positioned to locate the tabs correctly with reference to the blank width (axial direction of the platen).

At one side of the machine, secured to a frame side member 1, is a housing B containing controlling and "timing" mechanism.

Passing across the machine, and mounted in bearings in the side frame members, are shafts 17, 18 and 19. Each of these passes through the main plates or housings of the two tabbing units. Shaft 17 serves to rotate disks which carry tab gripping and applying heads, as later described, and may be called for identification an "applier shaft." It is constantly driven at the same speed as the platen shaft, and in the opposite direction, by a gear 21 engaging gear 20, previously mentioned. Shaft 18 oscillates the tab strip feed rolls, and shaft 19 operates the strip cutters, as presently explained.

Each tabbing unit A is organized as follows: A sleeve or hub 22 is slidably mounted on shaft 17, and slotted to engage a spline 23 on the shaft. The hub carries at one end a disk 24 on which applier heads 25 are mounted, and at the other end a gear 26. The hub passes through a bearing sleeve 27 formed in plate 10. The gear is located in a housing closed by a removable plate 28. A feed roll shaft 29 passes through a bearing sleeve 30, and on this shaft within the housing is a pinion 31, driven by a gear 32 on a gear body, which is mounted on a stub shaft 33 and also has a gear 34 of smaller diameter, engaging gear 26, the gear sizes being calculated to drive shaft 29 at such speed that the feed roll peripheries move at a linear speed substantially equal to that of the tab applier faces.

A feed roll 35 is secured on shaft 29 outside the housing, by a pin 36, and formed on the hub of this roll or otherwise secured to the shaft is a pinion 37, engaged by a pinion 38 secured on shaft 39 of a complemental feed roll 40. This roll is located between the arms of the yoke-like upper end of a roll carrier 41, and shaft 39 passes through and has bearings in said arms. The lower end of the carrier is bored to fit over a pin 42 secured in an oscillating strip-feed control body 43, which is formed with a sleeve 44 having a squared bore to fit the square contour of shaft 18, previously mentioned. Thus the sleeve, and body 43 are free to slide along the shaft, and connected to oscillate with it. The roll carrier 41 is yieldingly urged to move roll 40 inward in relation to the oscillating body 43, that is, toward roll 35, by a spring 45 and this inward movement is limited by engagement of the carrier arm with the adjacent part of sleeve 44.

The spring movement of the carrier is also utilized, desirably, in providing for quick mounting and dismounting of the carrier and roll. For this purpose the spring is in the shape of a helix, and located about a rod 46, one end of which slides in a hole in a pivot-stud 47 mounted in a clevis 48 of oscillating body 43, and the other end is pivoted on a pin 49, in a lever 50. The lever is pivoted at 51 on a part of the feed control body 43, and it has a lug 52 engaging an outward face of the upper end of roll carrier 41, between jaws 53, thereon; and also has a finger piece or handle 54. By depressing lever 50, spring 45 is compressed, lug 52 is moved out from between jaws 53, and the carrier is then free to slide laterally off of pin 42. This detachment of the carrier and its feed roll is thus very easily and quickly accomplished to give access to the tab strip in "threading" it through the feed rolls and cutter, or to remove portions of the strip which may have become "jammed" adjacent to the feed rolls or cutter, and the carrier can then be easily replaced by manipulating the parts in reverse order. Spring 45 is guided by its rod 46, and when the carrier is in operative position, acts through the lever 50 to urge feed roll 40 toward the fixed roll, in the normal cycle of the machine.

When shaft 18 is oscillated clockwise (Fig. 4) the feed rolls are engaged with the tab strip T and the strip is advanced a suitable distance for the formation of a tab of the desired length and at a point regulated by the controlling mechanism later described, the shaft is oscillated in the opposite direction, movable roll 40 is withdrawn slightly and the feed is discontinued. It is desirable to provide means for definitely checking the strip movement and holding the strip during feed intervals. For this purpose a movable strip retarding or brake element 55 is mounted on a lower portion of the oscillating body 43, and this is opposed by a fixed braking element 56 at the opposite side of the strip. Whenever the feed is discontinued the brake elements are engaged with the strip with sufficient force to check it quickly and hold it until the next feed operation, when the strip is released just before the feed commences. The brake elements may be of cork, felt, rubber composition, or other suitable material and desirably one of them, such as the movable element 55 is secured to a metal block 57 which has a pin 58 seated in a socket in the oscillating member 43.

The oscillating block 43 is provided with a flat strip guiding surface 59, confronting the strip at one side and at the other side of the strip is a similar guide surface 60 carried by a detachable block or plate 61. The upper end of this plate is provided with an eye or bearing sleeve 62 accommodating the end of roll shaft 29 and a lower portion of the plate fits over the stud 63 extending from a lower portion of plate 10. A thumb-nut 64 engages the threaded end of this stud and holds plate 61 detachably in position. Desirably the fixed brake element 56 is located in a socket formed in plate 61 near the lower end of guide surface 60.

Desirably guide rolls 65 and 66 are provided to direct the strip as it comes from the roll T' and these rolls are mounted in arms 67 depending from the lower ends of block 43 and plate 61, respectively. A strip roll holder is carried by each tabbing unit, consisting in the present instance of an arm 68 formed with a sleeve 69 fitting around stud 63 so that the roll holder arm is detachably secured in position by plate 61 and its thumb nut. The arm may be permitted to oscillate slightly and such movement is limited by lugs 70 engaging below a pin 71 located in plate 10 and a lug 72 extending from an inward face or plate 61. On the lower end of arm 68 is a spindle 73 supporting a rotatable roll carrying sleeve 74 and roll retaining plates or spiders 75, at least one of which is detachable from the sleeve and the parts last named are secured on the spindle by a nut 76.

Cutting mechanism is located directly above the feed rolls and this is designed so that it can be located very close to the rolls so that any difficulties resulting from the long stretch of tab material extending from the feed rolls to the cutter are avoided. The cutting mechanism comprises a base 80 detachably secured to plate 10 by screws 81. Extending from this base is a bottom plate 82 having a guide shoulder 83 and an outer guide rib 84. On this plate between the guide shoulder and the guide rib is a reciprocating cutter blade 85 secured by a top plate 86, and the plate is held by screws 87 passing through slots 88 in the cutter blade and through the holes in the base plate. Springs 89 engaging between the screw heads and the base plate hold the cutter blade and the top plate yieldably together and the plate pressure may be regulated by turning the screws. The three plates have registering slots to accommodate the top strip and at one side of its slot the cutter plate is provided with a cutting edge 90 and at the opposite side of its slot the top plate is provided with a cutting edge 91 and these edges cooperate to cut the strip and sever a tab when plate 85 is reciprocated. The cutting operation is controlled by an arm 92 having a rounded end 93 engaging a socket in the cutter blade, and having a hub 94 rotatably mounted on a circular block 95 slidably mounted about rock shaft 19 and contoured to fit the square sectional shape of the shaft so that the block 95 is oscillated whenever the shaft is oscillated by the controlling mechanism. The position of arm 92 is adjusted by screws 96 threaded into the hub and having opposed engagement with shoulders 97 in block 95, produced by suitably recessing the block.

The applier blocks 25, previously mentioned, carried by disk 24, have arc-shaped peripheral applying surfaces 100 arranged to move close to the upper cutter plate 86 (Fig.

4). Each applier head has a substantially radial tab gripping face 101, and in advance of this is a beveled or angular tab directing face 102. Desirably these faces are carried by a detachable gripper block 103 secured in a recess of the applier face. Cooperating with the gripping surface 101 is a movable gripper 104 carried by a hub 105 mounted on a pin shaft 106 turning in bearings in the head. The gripper hub is located in a central recess 107 of the gripper block and the gripper 104 operates in a slot 108 formed in the detachable block 103, this slot substantially bifurcating the beveled tab directing surface 102. An outer end of the pin shaft 106 carries an operating arm 109 provided with a cam roller 110 which cooperates with a cam plate 111, detachably or adjustably secured to the plate 10 by screws 112. The gripper is urged to active position by a spring 113, mounted about a spring rod 114 secured in a pivot pin 115 and passing through a stud 116 oscillatably mounted in a socket 117 formed in an extension of the hub 105.

As each gripper block approaches tab receiving position the gripper is retracted by engagement of roller 110 with cam plate 111. The upper end of the advancing tab strip T engages the beveled guide surfaces 102 and is thus located in relation to the gripper surface 101. The gripper 104 then closes and clamps the upper edge of the tab strip, as shown in Fig. 5, and for the shortest tab the controlling mechanism is arranged so that feed is discontinued and the tab is cut at about the same instant. As clearly shown in Fig. 5 the cutting point defined by the cutter edges 90 and 91 is very close to the applying surfaces 100 and to the gripper, and by the described arrangement a very short tab—as short as ⅜ of an inch—in one physical embodiment of the machine, can be satisfactorily produced and handled. The minimum tab length is also affected by the nature of the feed operating or controlling mechanism, as later described, and this mechanism is also devised so that a tab of practically the shortest desired length can be fed and cut—in other words, a tab as short as can be properly gripped, adhesively conditioned and applied to a sheet, such as a box covering blank. Each applier disk 24 usually carries two applying heads and the tab feed gripping and cutting operations are repeated with relation to each head as it passes the cutting position in one cycle of the machine, for the purpose of applying two separate tabs in line on one portion or near one side of the blank, for instance, the tabs $t'$ and $t''$. Fig. 6, in which the blank is advanced in the direction indicated by the arrow and the tab edge $e$ represents the direction of movement of the tab strip in the tab feeding operation, while the tab edge $f$ represents the width of the tab strip. In other words, Fig. 6 shows a very short tab produced by operations of the machine and applied to a box cover blank in proper position for the purposes in view.

The applier head disk 24 rotates continuously, and to produce longer tabs including the longest that are desired for any practical box staying purposes, the tab strip feed is continued after the advance end of the tab is gripped and the gripper 6 draws out through the cutter slots the tab strip as it is fed forward at practically the same rate by the feed rolls and at a proper point the feed is discontinued and the strip is cut. Where the tabs are longer than the minimum length the blank S may be arranged to move in a direction at a right angle to that indicated by the arrow, and in that case the tab edge $e$ represents the width of the tab strip, and the edge $f$ represents the length of the tab in the direction of strip feed.

As the applier heads move away from tab receiving position they pass close to a curved tab bending and guiding surface 120 formed as a part of one of the sleeves 14 of frame 10. The projecting part of the tab is thus bent back and caused to lie along the surface 100 of the applier head and the trailing part of a long tab is also supported and guided by the surface 120. The outer tab surface, except the very short margin held by the gripper faces is then brought in contact with a glue roll 121 forming a part of gluing mechanism which is desirably formed as a self-contained unit which may be readily mounted on and dismounted from the tabbing unit A. The main body or frame of the gluing unit consists of a glue tank 122 having an open end in which the glue roll is mounted on a shaft 123 turning in bearings 124. A relatively stiff, viscous, or slow flowing glue is usually employed and this is placed in the tank up to a proper level, somewhat above the lower surface of the glue roll. A hinged cover 125 is provided for easily filling the tank. A guard or scraper is located in the lower part of the tank front below the glue roll, and this is arranged to be adjusted vertically to regulate the amount of glue supplied to the roll surface for application to the tabs. For convenient adjustment the guard is provided with an aperture engaged by an eccentric 127 located on the end of an adjusting rod 128 mounted in lugs 129 below the tank. The outer end of the rod carries an adjusting lever or handle 130, convenient to the operator, and this lever desirably has a pointer or index member 131 moving over a suitably inscribed or calibrated sector 132 to indicate the positioning of the scraper 126. Desirably also a locking device is provided consisting in the present case of a nut 133 engaging a screw thread on the rod and arranged to bear against one of the lugs 129, and this nut has a handle or finger piece 134 for its convenient manipulation. The gluer shaft is driven by connection with a stub shaft 135 rotatably mounted in the housing of frame 10. This stub shaft has a gear 136 driven by an idler gear 137, which is in turn driven by pinion 34, previously mentioned. Desirably the driving connection of roll shaft 123 is arranged for quick attachment and removal, for instance, by providing the end of shaft 123 with a lug or jaw 138 engaging a slot formed in the adjacent end of stub shaft 135. The gluing unit is provided with a rib or lug 139 fitting a channel 140 formed in a rearward extension of frame or plate 10, and is secured in position by a bolt or screw 141. Thus by loosening one screw the entire gluing unit may be quickly removed and may be easily replaced by positioning the glue shaft to properly engage with the slotted end of stub shaft 135, inserting lug 139 in its socket and setting up the screw 141. Sometimes tabs become loosened from the gripper adjacent to the gluing mechanism. This may happen, for example, when the machine is being adjusted or tested and when in the absence of a blank several tabs may be seized or retained by the gripper in successively passing the tab receiving position. In this or some other way tabs sometimes adhere to the glue roll, and to prevent them getting into the glue tank and also to remove them from the roll as speedily as possible, a tab guard or scraper 144 is provided having an edge adjacent to the roll surface and adapted to intercept and remove any tab adhering thereto. The guard is provided with slots 145 so that it may be adjusted toward and from the roll and secured in adjusted position by screws 146 passing through the slots and engaging flanges 147, formed on the tank walls. The guard is provided with apertures 148 to permit glue which may run over its upper surface to drain down into the tank, and desirably the guard is surrounded by a flange 149 to confine glue and prevent it from spreading.

The glued tabs are carried onward to the position of the right hand applying head 25, Fig. 4, and the forward glued portion is there brought in contact with the blank 5, which is usually supported by a pad or cushion 150 of felt, rubber or other suitable yielding material. At about this moment the gripper 104 is retracted by engagement of the corresponding cam roll 110 with the upper end of cam plate 111. Further rotative engagement of the gripper head applying surface and the blank brings subsequent portions of the tab into close adhesive contact with the blank or, in other words, the tab is rolled into contact with the blank by the applying surface 100 of the gripper head. When the tab is unusually long it may extend behind the applying surface of the gripper head. For use in such cases additional means for pressing and securing the tab in position are desirably provided, consisting in the present case of a tab pressing roll 155 located below the point of initial tab contact and out of the way of the gripper head. This roll is carried by an arm 156 pivotally mounted on or about sleeve 14 of frame 10 and urged to active position by a spring 157 and also provided with a stop 158 to limit inward movement of the pressing roll, for instance, opposite a recessed portion 160 of the platen.

To provide for convenient mounting and dismounting of the applier heads and their adjustment angularly in respect to disk 24, the disk is desirably provided with a part circular T-slot 164, and each applier head is provided with a bolt 165 having a head 166 engaging in the slot and a nut 167 to lock the head in adjusted position. The base 167ª of the head is curved to conform to the curved periphery of the disk. Since the sheet or blank to be tabbed usually only occupies a part of the periphery of the platen 3, the disk 24 may have one portion cut away, as shown in Fig. 4, the cut-out portion of the disk corresponding more or less to the unoccupied surface of the platen. This affords an opening in the disk which makes the ends 170 of the T-slot accessible, so that the applying heads can be easily inserted or removed by slightly loosening the nuts 167 and moving the heads around until they are free from the T-slot.

Each applier head is so positioned on the disk that the initially applied end of the corresponding tab will be in the correct position on the blank, as sufficiently understood by inspecting Fig. 6. The tabbing units A are then adjusted laterally with due regard to the position on the blank of the two rows of tabs (each row consisting in the present case of two tabs), and in this adjustment movement the sleeves 22 slide on the drive shaft 17, sleeve 44 which operates the oscillating feed roll body 43 slides in shaft 18, and circular blocks 95 which operate the slide on shaft 19, the rotative or oscillating engagement of these members with the respective shafts being always maintained.

The controlling and timing mechanism is located in the housing B, Figs. 1, 7 and 8. In an upper portion of the housing a cam disk 175 is secured on drive shaft 17. This disk has a part circular T-slot 176, substantially similar to the T-slots of the applier disks, previously described. At least one, and in the present embodiment, to correspond with the number of applier heads of each tabbing mechanism, two cam bodies, 177, Fig. 10, are adjustably secured on the disk in the same manner as described with reference to the applier head. The disk 175 also has a cut-out segment 178 corresponding to the cut-out portions of the applier disks. The disk 175 may be identified conveniently in some cases as a timing disk and the cam bodies with their cams may be referred to as timing cams. Each cam body in the present specific structure has two distinct cam lobes 180 and 181, the first being arranged somewhat in advance of the other (Figs. 7 and 8), and the two being laterally offset (Fig. 10). The two distinct cam lobes correspond to the convenient structural features of the timing mechanism, but in some cases a single cam lobe will suffice to control both the feed and cut-off function. In the present instance the cam bodies are adjusted with definite relation to the positions of the two applier heads of each tabbing unit, the foremost cam body corresponding to the foremost applier head of each tabbing unit, and so that the tab feed is initiated by the action of cam lobe 180 at the proper moment to advance the forward edge of the tab strip to the proper position for gripper engagement, as the gripper produces the tab gripping position, as shown in Fig. 4. Cooperating with this cam lobe is a cam roller 185 carried by a lever 186 fulcrumed at 187 and having its outward end pivotally connected to a link 188 which is in turn pivotally and adjustably connected at 189 to a body or lever 190 of approximately bell crank form, the hub of which is fixed on the end of feed controlling rock shaft 18 which extends into the control box. The block 190 is provided with a detachable piece 191 having a shoulder at 192. The block 190 is also acted upon by a spring 193 supported by a spring plunger 194 pivotally connected at 195 to the lever block and passing through a guide hole in a plate 196 secured to the housing. Cooperating with shoulder 192 is a detent 197 pivoted on a body 198 which forms substantially part of a lever having a hub 199 secured on cutter operating rock shaft 19 which extends into the housing. The lever 198 is urged to the left, Fig. 7, by a spring 200, cooperating with a spring plunger 201, pivoted to the lever at 202 and guided by a plate 203 secured to the housing. Detent 197 is urged to active position by a spring 204. When cam lobe 180 strikes roller 185 lever 186 is oscillated and by the link connection, bell crank lever 190 is also oscillated and this movement oscillates shaft 18 and the oscillating feed roll carrying block body 43 in each tabbing unit and so starts the tab strip feed in the manner previously described. The stated movement of lever 190 retracts shoulder 192 to such a position that it is engaged by the detent 197 and the parts are then in the position shown in Fig. 7. Detent 197 retains the lever 190 and its connected parts, including the feed rolls 40 in active position and the feed continues for a definite time, depending on the adjustment of the timing mechanism, and until the detent 197 is retracted. To discontinue the feed and at the same time operate the cutter to sever the tab, cam lobe 181 cooperates with a roller 207 carried by a bell crank lever 208 fulcrumed at 209 on an arm 210 which is arranged to swing about the axis of shaft 17. The depending portion of lever 208 is formed into a fork 211 provided with rollers 212 engaging in a shifting collar 213 connected to a screw shaft 214 arranged to reciprocate and rotate in bearings formed in plates 215 and 216 secured to the timing housing. Shaft 214 is provided with a long screw threaded portion 220 and on this screw thread near one end is secured a shifting collar 221 which may be adjusted by rotating it on the screw and may be locked in adjusted position by a nut 222. The shifting collar engages a fork 223 formed in an upwardly extending part of the lever 198. After the feed is initiated in the manner above described it continues in operation during the further advance of the cam body and until cam lobe 181 engages roller 207. Thereupon bell crank 208 is oscillated, the screw shaft 214 is moved to the left as viewed in Fig. 8, lever 198 is oscillated so that its lower portion is swung to the right and the toe of detent 197 is moved down away from shoulder 192. Spring 193 thereupon oscillates lever 190 counterclockwise and shaft 18 is thus oscillated to retract the strip feed rolls and stop the feed. The movement of lever 198 just described at the same time oscillates shaft 19 and this shaft movement operates both of the cutters of the tabbing mechanisms and cuts off a tab in each mechanism at substantially the instant that the feed is interrupted. Immediately after cam lobe 181 passes roller 207 lever 198 is moved back by its spring 200 to normal position, as shown in Fig. 8, with detent 197 ready to reengage shoulder 192 in the next feed action. As the second cam body, which is properly adjusted with relation to the second applier head of each tabbing mechanism, approaches the roller 185, the tab feed is again commenced and maintained to form the second set of tabs and the feed is then interrupted and the tabs cut as the cam body cooperates with roller 207. The timing mechanism as so far described may, of course, be constructed for tabs of any desired length, but it is very desirable in a machine of this class to form tabs of various lengths with small or imperceptible variations between the different tab lengths and also to form very short, as well as long tabs. Adjusting mechanism is, therefore, provided to enable the tab length to be adjusted by practically imperceptible gradations and provision is also made for making this adjustment while the machine is running, as well as when it is standing still. Shifting collar 213 is formed as a part of a sleeve 230 which has screw threaded engagement with screw shaft 220 and passes through a bearing sleeve formed in a shiftable block 231. Sleeve 230 carries a pinion 232 and sufficient clearance is provided between the pinion and block 231 and between shifting collar 213 and the block to permit the screw shaft and the sleeve 230 to reciprocate a limited distance in relation to the block, the sleeve sliding endwise in its bearing during this reciprocating movement. The screw shaft is prevented from rotating and at the same time permitted to reciprocate by a key 233 engaging a keyway in the shaft and fixed in plate 216. The shiftable block 231 extends substantially horizontally, as understood by comparing Figs. 7 and 9, and a screw shaft 234 located parallel to shaft 214 and directly behind it as viewed in Fig. 7, passes through the block and has threaded engagement with it. The shiftable block is thus supported on screw 234, and on sleeve 230. The ends of shaft 234 are rotatably mounted in bearings in plates 215 and 216, and the shaft is secured against end movement. The shaft is provided with a longitudinal channel 235 and a gear 236 is mounted slidably on the shaft and has a spline engaging in the channel; and the gear is connected to slide upon the shaft in accordance with movement of the block 231 by a yoke 237 secured to the block and engaging an annular shifting groove 238 on the gear. Gear 236 engages pinion 232 of sleeve 230 and the face of gear 236 is sufficiently wide to permit the pinion to move axially in relation to the gear a distance equal to the necessary reciprocating movement of shaft 214. An end of shaft 234 extending outside the housing carries a hand-knob 240, by which screw 234 may be rotated to adjust the timing mechanism. Arm 210, previously mentioned, has a part extending below the fulcrum point of lever 208 and this part of the arm is connected by a link 210$^a$ to the adjustable block 231.

Desirably, indicating or indexing means are provided in connection with the adjusting mechanism, consisting in the present instance of a pointer 241 extending from the adjustable block 231 and through a slot 242 in an outer portion of the housing B. This slot or opening 242 is formed in the present instance in a detachable plate 243 covering an open side of the control box, to give access to the mechanism therein. Suitable calibrations 244 are provided on a surface of the plate alongside the slot 242 and desirably the index finger or pointer 241 has a score line 245 which may be accurately placed to register definitely with a certain one of the fixed calibrations when the adjustable block 231 is in a predetermined position. Evidently, then, as the block is adjusted to vary the tab length, the score mark 245 will indicate, with reference to the calibrations 244, the adjusted position of the mechanism, or the length of tab being produced.

Desirably the housing B has a detachable or pivotally mounted top piece or cover 246, giving access to disk 175 and the cams thereon so that the cams may be conveniently adjusted.

When the hand-knob 240 is rotated in a right hand direction, that is in accordance with the lead of its screw surface 234, as shown in Fig. 9, the engagement of this screw with the adjustable block 231 moves the block to the left as seen in that figure, and also in Figs. 7 and 8. By the link connection 210$^a$ arm 210 is swung to the left, Figs. 7 and 8, and the fulcrum point 209 of lever 208, and the lever are moved to the left carrying the cam roller 207 away from the cam roller 185 of the feed controlling lever 186. This movement corresponds to an increased tab length. At the same time the movement of block 231, by reason of the yoke connection 237 with gear 236 causes the gear to be traversed along shaft 234; and by reason of the splined connection of this gear with the shaft the gear is simultaneously rotated, this movement being imparted to pinion 232; sleeve 230 is thus rotated in a left hand direction as viewed from the position of the hand knob, and the sleeve with its connected parts, including the shifting collar 213, is traversed along shaft 214, "keeping up", so to say, with the block, and in this way by the connection of lever 208 with the shifting collar the position of roller 207 is adjusted simultaneously with the adjustment of the lever fulcrum. In this way the roller is always kept in the path of the corresponding cam lobe to effect the feed stopping and cut-off actions in any of the adjustments of the controlling mechanism. By turning the hand-knob in the other direction the block is moved to the right and roller 207 is brought closer to roller 185, this movement corresponding to a shorter tab length and in the extreme right hand position of roller 207 it is almost in line with roller 185, as viewed from the position of Figs. 7 and 8, this corresponding to the shortest possible tab, the interval between initiation of tab feed and the stopping of the feed and cutting off of the tab being indicated in this case substantially by the linear distance between cam lobes 180 and 181.

It is therefore, apparent that an indefinite number of adjustments may be made, corresponding to substantially any variations in tab length, also that the adjustment may be made while the machine is in full operation. This is desirable, not only in carefully adjusting the tab length to meet particular requirements, while the tabbing mechanism is running and before blanks are fed for tabbing, but during the actual automatic tabbing of successive blanks carried by the blank platen, since in some cases the tab length tends to vary somewhat, and this variation can be corrected by the attendant, by moving the hand-knob 240, without stopping the machine or in any way interfering with its output.

In the tabbing machine disclosed in the above-mentioned patent, there is no adjustment, properly so-called, for tab length, the tab feed and feed stopping being controlled by segmental gear blocks carried by a rotor similar to disk 175 and arranged to engage with a pinion mounted on a fixed axis. Any variation in tab length must be accomplished by removing these segment gear blocks and substituting others, and since the gear teeth must be made of a certain thickness in order to provide the necessary strength to resist the shock of engagement with the pinion, and for other reasons, the intervals between tab lengths permissible in such a machine are quite definitely limited, also the minimum length of tab is limited by the necessity for providing at least a single tooth on each gear segment block, and manifestly, even a single tooth in engagement with the pinion will advance the tab strip a considerable distance. Owing to these conditions, in a particular embodiment of a patented machine, the shortest possible tab is $\frac{7}{8}''$ long and subsequent tab lengths in the series run as follows: $1\frac{3}{16}''$; $1\frac{1}{2}''$, etc.; in other words, intervals between tab lengths are considerable, and it is impossible to provide all the gradations of tab length that are desirable in machines of this class.

In the patented machine there are also, in addition to tab applying heads, and the feed controlling gear segments just above mentioned, cut-off operating cams, which require independent adjustments with relation to positions of the applying heads and gear segments; in other words, there are, considering only a single tabbing mechanism, three sets of rotary devices requiring independent adjustment or replacement, while in the present invention there are only two sets of such devices, namely the applier heads and the cam bodies 177. Also, in the patented machine independent lateral adjustments must be made of a number of independent elements, more directly concerned in the actual tabbing operations, these including the disks 10 carrying applier heads 25, the feed and cut-off mechanisms 25, and the gluing mechanisms 41, while in the present machine the tabbing mechanism proper, including the tab feed and cut-off mechanism, the applying heads, and the gluing mechanism, are all arranged as a substantially unitary structure, and can be adjusted for the lateral positioning of the tabs by a single operation. Many other differences and advantages will be evident without particular description.

What we claim is:—

1. In tabbing mechanism, an operative unit comprising a tab strip feed means, a strip retarder operated in conjunction with the feed means, a cutter, and means for grasping, advancing, gumming and applying severed tabs.

2. In tabbing mechanism, an operative unit comprising tab-strip feeding means, a cutter, a rotary applier-head carrier, a plurality of applier heads adjustably mounted on the carrier, and a gripper on each head.

3. In tabbing mechanism, an operative unit comprising a tab strip roll holder, rotary strip guides, strip feed means, a strip retarder operated in conjunction with the feed means, a cutter, and means for gripping and forwarding tabs severed by the cutter to a point of application.

4. In tabbing mechanism, an operative unit comprising tab strip feeding means, a cutter, a rotary applier head carrier, one or more applier heads on the carrier, grippers on the applier heads for grasping and moving tabs severed by the cutter to an application point, means for driving the feeding means, cutter and applier head carrier, and a gluing unit detachably mounted and including a glue roll arranged to apply glue to tabs carried by the applier heads.

5. In tabbing mechanism, an operative unit comprising tab strip feeding means, a cutter, a rotary applier head carrier, one or more applier heads on the carrier, grippers on the applier heads for grasping and moving tabs severed by the cutter to an application point, means for driving the feeding means, cutter and applier head carrier, and a gluing unit detachably mounted and including a glue roll arranged to apply glue to tabs carried by the applier heads, and a disconnectable driving connection between the glue roll and said driving means of the unit, arranged so that the glue roll driving connection is effective when the gluing unit is secured in position.

6. Tabbing mechanism, comprising means for holding and advancing a sheet to be tabbed, means for feeding a measured length of a strip of tab material, retractible means for retarding the strip, means for cutting the strip to form a tab, and means for applying the tab to said sheet.

7. Tabbing mechanism, comprising means for holding and advancing a sheet to be tabbed, means for feeding a variable length of a strip of tab material, retractible means for retarding the strip, means for cutting the strip to form a tab, and means for applying the tab to said sheet.

8. Tabbing mechanism, comprising means for holding and advancing a sheet to be tabbed, means for feeding a length of a strip of tab material, means for retarding the strip at about the end of the feed movement, means for cutting the strip to form a tab, and means for applying the tab to said sheet.

9. Tabbing mechanism, comprising means for holding and advancing a sheet to be tabbed, means for feeding a variable length of a strip of tab material, means for retarding the strip at about the end of the feed movement, means for cutting the strip to form a tab, and means for applying the tab to said sheet.

10. Tabbing mechanism, comprising means for holding and advancing a sheet to be tabbed, means for feeding a strip of tab material, a brake, interconnected with the feed means and acting on the strip substantially at the end of the feed movement, a cutter, and means for gripping and applying the cut-off tab to said sheet.

11. Tabbing mechanism, comprising means for holding and advancing a sheet to be tabbed, means for feeding a strip of tab material, a stationary brake member, a movable cooperating brake member interconnected with the feed means acting on the strip substantially at the end of the feed movement, a cutter, and means for gripping and applying the cut-off tab to said sheet.

12. In tabbing mechanism, a sub-combination comprising strip feed rolls, means for driving one of them, a movable carrier for one of the rolls, means for advancing and retracting the carrier, a strip-brake member on the carrier, and an abutment against which the strip is pressed by the brake member when the carrier is moved to retract its roll.

13. In tabbing mechanism, a sub-combination comprising strip feed rolls, means for driving one of them, an oscillating support for one roll, means for moving the support, a strip brake on said support, and an abutment against which the strip is pressed when the support is moved to retract its roll.

14. In tabbing mechanism, a sub-combination comprising a pair of strip feed rolls, one mounted on a fixed axis, a movable mounting for the other roll, means for driving the fixed roll, pinions connected with the respective rolls and engaging each other, and with teeth long enough to maintain rotative contact when the movable roll is in retracted position, means for moving said roll mounting, and a strip brake connected to move with said roll mounting.

15. In tabbing mechanism, a sub-combination comprising a frame, a strip feed roll thereon, a cooperating feed roll, an oscillating member mounted on the frame, a carrier for the cooperating feed roll detachably mounted on the oscillating member, and means retaining said carrier detachably in position.

16. In tabbing mechanism, a sub-combination comprising a frame, a strip feed roll thereon, a cooperating feed roll, an oscillating member mounted on the frame, a carrier for the cooperating feed roll detachably mounted on the oscillating member, and a yieldable clip holding said carrier detachably in position.

17. In tabbing mechanism, a unitary sub-combination comprising a frame, a strip feed roll thereon, a cooperating feed roll, an oscillating member mounted on the frame, a carrier for the cooperating feed roll pivotally mounted on the oscillating member, and a spring urging said carrier toward the stationary feed roll.

18. In tabbing mechanism, a sub-combination comprising a frame, a strip feed roll thereon, a cooperating feed roll, an oscillating member mounted on the frame, a carrier for the cooperating feed roll pivotally and detachably mounted on the oscillating member, a clip holding said carrier detachably in position and a spring urging said carrier toward the stationary feed roll and retaining the clip in engagement with the carrier.

19. In tabbing mechanism, a sub-combination comprising a frame, a strip feed roll thereon, a cooperating feed roll, an oscillating member mounted on the frame, a brake element on the oscillating member, a stationary cooperating brake element, a carrier for the cooperating feed roll detachably mounted on the oscillating member, and a yieldable clip holding said carrier detachably in position.

20. In tabbing mechanism, a sub-combination comprising a frame, a strip feed roll thereon, a cooperating feed roll, an oscillating member mounted on the frame, a brake element on the oscillating member, a stationary cooperating brake element, a carrier for the cooperating feed roll detachably mounted on the oscillating member, a yieldable clip holding said carrier in position, and a spring urging said carrier toward the stationary feed roll, and also holding the clip in active position.

21. In tabbing mechanism, a sub-combination comprising a frame, a strip feed roll thereon, a cooperating feed roll, an oscillating member mounted on the frame, a brake element on the oscillating member, a stationary cooperating brake element, a carrier for the cooperating feed roll pivotally and detachably mounted on the oscillating member, a yieldable clip holding said carrier detachably in position, and a spring holding the clip in active position and also urging said carrier toward the stationary feed roll.

22. In a tabbing machine, a sub-combination comprising a feed roll, a body mounted to oscillate in relation to said roll, means for oscillating said body, a pin on said body, a roll carrier removably mounted on said pin, a spring clip engaging said carrier and retaining it yieldingly in position, and a second cooperating feed roll on said carrier.

23. In a tabbing machine, a sub-combination comprising means for intermittently feeding a tabstrip, means for gripping and advancing a tab for application, and cutting means including a movable cutter, an oscillating shaft, an arm thereon connected to the movable cutter, and means for adjusting the arm angularly in the shaft.

24. In a tabbing machine, a sub-combination comprising means for advancing and cutting a tab strip to form tabs, and means for gripping and advancing the tabs to a point of application, including a rotary member, and applying head thereon, having an arcuate peripheral applying face, and a gripper face and also having an angular tab guiding face extending from the gripper face, and a movable gripper cooperating with said gripper face.

25. In a tabbing machine, a sub-combination comprising means for advancing and cutting a tab strip to form tabs, and means for gripping and advancing the tabs to a point of application, including a rotary disk having an arcuate T-slot, an applying head adjustably secured thereon and having a member adjustably engaged in said slot, and also having an arcuate peripheral applying face, a gripper face and an angular tab-guiding face extending from the gripper face, and a movable gripper cooperating with said gripper face.

26. In a tabbing machine, a sub-combination comprising means for feeding and cutting a strip to form tabs, a gluer, means for gripping and advancing tabs past the gluer, and a tab guide acting to bend back and direct a trailing portion of the tab and located between the gripping point and the gluer.

27. In a tabbing machine, a sub-combination comprising means for feeding and cutting a strip to form tabs, a gluer, means for gripping and advancing tabs past the gluer, and a tab guide having a curved face acting to bend back and direct a trailing portion of the tab and located between the gripping point and the gluer.

28. In a tabbing machine, a sub-combination comprising means for feeding and cutting a tab strip to form tabs, means for gripping and advancing the tabs, a glue roll positioned to engage the advancing tabs, means for supplying glue to the roll, and an adjustable scraper to regulate the amount of glue carried by the active surface of the roll.

29. In a tabbing machine, a sub-combination comprising means for feeding and cutting a tab strip to form tabs, means for gripping and advancing the tabs, a glue roll positioned to engage the advancing tabs, means for supplying glue to the roll, an adjustable scraper to regulate the amount of glue carried by the active surface of the roll, and indexing means for adjusting the scraper.

30. In a tabbing machine, a sub-combination comprising means for feeding and cutting a tab strip to form tabs, means for gripping and advancing the tabs, a glue roll positioned to engage the advancing tabs, means for supplying glue to the roll, a scraper blade adjacent to the roll surface anterior to the point of tab contact, means for adjusting the scraper, a rod extending from the adjusting means, and an index member on the rod moving adjacent to a scale.

31. In a tabbing machine, a sub-combination comprising means for feeding and cutting a tab strip to form tabs, means for gripping and advancing the tabs, a glue roll positioned to engage the advancing tabs, means for supplying glue to the roll, a scraper blade adjacent to the roll surface anterior to the point of tab contact, an eccentric for adjusting the scraper, a rod extending from the eccentric, and an index member on the rod.

32. In a tabbing machine, a sub-combination comprising means for feeding and cutting a tab strip to form tabs, means for gripping and advancing the tabs, a glue roll positioned to engage the advancing tabs, means for supplying glue to the roll, a scraper blade adjacent to the roll surface anterior to the point of tab contact, an eccentric for adjusting the scraper, a shaft extending from the eccentric to an accessible position, an adjusting handle on the shaft, and a lock nut on the shaft provided with a handle.

33. In a tabbing machine, a sub-combination comprising means for feeding and cutting a tab strip to form tabs, means for gripping and advancing the tabs, a glue roll positioned to engage the advancing tabs, means for supplying glue to the roll, a scraper blade adjacent to the roll surface anterior to the point of tab contact, an eccentric for adjusting the scraper, a shaft extending from the eccentric to an accessible position, an adjusting handle on the shaft, an index plate for the handle, and a lock nut on the shaft provided with a handle.

34. In tabbing mechanism, means for feeding, cutting and applying stay or like tabs, a glue roll acting on the tabs en route to application position, and a tab guard adjacent to the roll to divert tabs adhering to the roll.

35. In tabbing mechanism, means for feeding, cutting and applying stay or like tabs, a glue roll acting on the tabs en route to application position, and a tab guard adjustably mounted adjacent to the roll to divert tabs adhering to the roll.

36. In tabbing mechanism, means for feeding, cutting and applying stay or like tabs, a glue roll acting on the tabs en route to application position, and a tab guard adjacent to the roll to divert tabs adhering to the roll, the guard being apertured for passage of glue.

37. In tabbing mechanism, means for feeding, cutting and applying stay or like tabs, a glue roll acting on the tabs en route to application position, and a tab guard adjustably mounted adjacent to the roll to divert tabs adhering to the roll, the guard being apertured for passage of glue.

38. Tabbing mechanism comprising means for advancing a sheet to be tabbed, means for feeding a tab strip, means for cutting the strip to form tabs, means for controlling the feed, and means for adjusting said controlling means while the machine is in operation.

39. Tabbing mechanism comprising means for advancing a sheet to be tabbed, means for feeding a tab strip, means for cutting the strip to form tabs, means for controlling the feed and the cut off, and means for adjusting said controlling means to simultaneously vary the feed and cut-off.

40. Tabbing mechanism comprising means for advancing a sheet to be tabbed, means for feeding a tab strip, means for cutting the strip to form tabs, means for controlling the feed and the cut-off, and means for adjusting said controlling means to simultaneously vary the feed and cut-off while the machine is in operation.

41. Tabbing mechanism comprising means for advancing a sheet to be tabbed, means for feeding a tab strip, means for cutting the strip to form tabs, means for starting the feed and maintaining the feed in operation to form a tab of stated length, means for operating the cutter, and means acting in substantial synchronism with the cutter operating means to stop the feed.

42. Tabbing mechanism comprising means for advancing a sheet to be tabbed, means for feeding a tab strip, means for cutting the strip to form tabs, means for starting the feed and maintaining the feed in operation to form a tab of stated length, means for operating the cutter, and means interconnected with the cut-off operating mechanism to stop the feed.

43. Tabbing mechanism comprising means for advancing a sheet to be tabbed, means for feeding a tab strip, means for cutting the strip to form tabs, means for starting the feed and maintaining the feed in operation to form a tab of stated length, means for operating the cutter, and means for simultaneously adjusting the cut-off and feed stopping mechanisms.

44. Tabbing mechanism comprising means for advancing a sheet to be tabbed, means for feeding a tab strip, means for cutting the strip to form tabs, means for starting the feed and maintaining the feed in operation to form a tab of stated length, means for operating the cutter, means acting in substantial synchronism with the cutter, and means for varying the cut-off position while the machine is moving.

45. Tabbing mechanism comprising means for advancing a sheet to be tabbed, means for feeding a tab strip, means for cutting the strip to form tabs, means for starting the feed, a detent to maintain the feed in operation to form a tab of stated length, means for operating the cut off, and means acting in substantial synchronism with the cut-off operation to release the detent.

46. Tabbing mechanism comprising means for advancing a sheet to be tabbed, means for feeding a tab strip, means for cutting the strip to form tabs, means for starting the feed, a detent to maintain the feed in operation to form a tab of stated length, means for operating the cut off, and means interconnected with the cut off mechanism to release the detent and stop the feed.

47. Tabbing mechanism comprising means for advancing a sheet to be tabbed, means for feeding a tab strip, means for cutting the strip to form tabs, means for starting the feed, a detent to maintain the feed in operation to form a tab of stated length, means for operating the cut off, means acting in substantial synchronism with the cut-off operation to release the detent, and means for varying the moment of cut-off.

48. Tabbing mechanism comprising means for advancing a sheet to be tabbed, means for feeding a tab strip, means for cutting the strip to form tabs, means for starting the feed, a detent to maintain the feed in operation to form a tab of stated length, means for operating the cut off, means acting in substantial synchronism with the cut-off operation to release the detent, and means for varying the moment of cut-off while the machine is running.

49. Tabbing mechanism comprising a rotary blank platen, means for gripping and carrying tabs for application to a blank on the platen, tab strip feed rolls, a strip cutter, means for moving a feed roll to initiate strip feed, means for retaining the roll in feed position, means for operating the cutter, and means operating substantially concurrently with the cutter operating means for releasing the feed roll retaining means.

50. Tabbing mechanism comprising a rotary blank platen, means for gripping and carrying tabs for application to a blank on the platen, tab strip feed rolls, a strip cutter, means for moving a feed roll to initiate strip feed, means for retaining the roll in feed position, means for operating the cutter, means operating substantially concurrently with the cutter operating means for releasing the feed roll retaining means, and means for regulating the strip feed and cut-off.

51. Tabbing mechanism comprising a rotary blank platen, means for gripping and carrying tabs for application to a blank on the platen, tab strip feed rolls, a strip cutter, means for moving a feed roll to initiate strip feed, means for retaining the roll in feed position, means for operating the cutter, means operating substantially concurrently with the cutter operating means for releasing the feed roll retaining means, and means for regulating the strip feed and cut-off while the machine is in operation.

52. Tabbing mechanism comprising a rotary blank platen, means for gripping and carrying tabs for application to a blank on the platen, tab strip feed rolls, a strip cutter, means for moving a feed roll to initiate strip feed, means for retaining the roll in feed position, means for operating the cutter, means operating substantially concurrently with the cutter operating means for releasing the feed roll retaining means, and means for regulating the cutting action while the machine is in operation.

53. Tabbing mechanism comprising a rotary blank platen, means for gripping and carrying tabs for application to a blank on the platen, tab strip feed rolls, a strip cutter, means for moving a feed roll to initiate strip feed, means for retaining the roll in feed position, means for operating the cutter, means operating substantially concurrently with the cutter operating means for releasing the feed roll retaining means, and means for regulating the strip feed and cut-off simultaneously while the machine is in operation.

54. Tabbing mechanism comprising a rotary blank platen, means for gripping and carrying tabs for application to a blank on the platen, tab strip feed rolls, a strip cutter, means for moving a feed roll to initiate strip feed, a detent for retaining the roll in feed position, means for operating the cutter, and means interconnected with the cutter operating means for releasing the detent.

55. Tabbing mechanism comprising a rotary blank platen, means for gripping and carrying tabs for application to a blank on the platen, tab strip feed rolls, a strip cutter, means for moving a feed roll to initiate strip feed, a detent for retaining the roll in feed position, means for operating the cutter, means interconnected with the cutter operating means for releasing the detent, and means for regulating the cut-off action.

56. Tabbing mechanism comprising a rotary blank platen, means for gripping and carrying tabs for application to a blank on the platen, tab strip feed rolls, a strip cutter, means for moving a feed roll to initiate strip feed, a detent for retaining the roll in feed position, means for operating the cutter, means interconnected with the cutter operating means for releasing the detent, and means for regulating the cut-off action while the machine is in operation.

57. Tabbing mechanism comprising a rotary blank platen, means for gripping and carrying tabs for application to a blank on the platen, tab strip feed rolls, a strip cutter, means for moving a feed roll to initiate strip feed, a detent for retaining the roll in feed position, means for operating the cutter, means interconnected with the cutter operating means for releasing the detent, and means for regulating the strip feed and cutting action.

58. Tabbing mechanism comprising a rotary blank platen, means for gripping and carrying tabs for application to a blank on the platen, tab strip feed rolls, a strip cutter, means for moving a feed roll to initiate strip feed, a detent for retaining the roll in feed position, means for operating the cutter, means interconnected with the cutter operating means for releasing the detent, and means for regulating the strip-feed and cut-off action while the machine is in operation.

59. Tabbing mechanism comprising tab strip feed rolls, means for driving the rolls, a movable mounting for one of the rolls, a cutter, a cutter operating member, and controlling mechanism comprising a rotary member, one or more cams thereon, a cam actuated member arranged to operate the movable feed roll mounting, a detent interconnected with the cutter operating member, a second cam actuated member adjustably located posterior to the first cam operated member and connected to move the cutter operating member and simultaneously to withdraw the detent to stop the strip feed.

60. Tabbing mechanism comprising tab strip feed rolls, means for driving the rolls, a movable mounting for one of the rolls, a cutter, a cutter operating member, controlling mechanism comprising a rotary member, one or more cams thereon, a cam actuated member arranged to operate the movable feed roll mounting, a detent interconnected with the cutter operating member, a second cam actuated member adjustably located posterior to the first cam operated member and connected to move the cutter operating member and simultaneously to withdraw the detent to stop the strip feed, and means for moving the second cam actuated member to adjust the strip feed and cut-off.

61. Tabbing mechanism comprising tab strip feed rolls, means for driving the rolls, a movable mounting for one of the rolls, a cutter, a cutter operating member, controlling mechanism comprising a rotary member, one or more cams thereon, a cam actuated member arranged to operate the movable feed roll mounting, a detent interconnected with the cutter operating member, a second cam actuated member adjustably located posterior to the first cam operated member and connected to move the cutter operating member and simultaneously to withdraw the detent to stop the strip feed, and means for moving the second cam actuated member while the machine is in normal operation to adjust the strip feed and cut-off.

62. Tabbing mechanism comprising tab strip feed rolls, an oscillating mounting for one of the rolls, means for driving the rolls, a cutter, an oscillating member for operating the cutter, and controlling mechanism comprising a rotary member, one or more cams adjustably mounted thereon, a cam actuated member arranged to oscillate the movable feed roll mounting, a detent interconnected with the oscillating operating member of the cutter, a second cam actuated member adjustably located posterior to the first cam operated member and connected to oscillate the cutter operating member and simultaneously to withdraw the detent to stop the strip feed.

63. Tabbing mechanism comprising tab strip feed rolls, an oscillating mounting for one of the rolls, means for driving the rolls, a cutter, an oscillating member for operating the cutter, controlling mechanism comprising a rotary member, one or more cams adjustably mounted thereon, a cam actuated member arranged to oscillate the movable feed roll mounting, a detent interconnected with the oscillating operating member of the cutter, a second cam actuated member adjustably located posterior to the first cam operated member and connected to oscillate the cutter operating member and simultaneously to withdraw the detent to stop the strip feed, and means for shifting said second cam actuated member bodily while maintaining its operative connection, to vary the strip feed and cut off.

64. Tabbing mechanism comprising tab strip feed rolls, an oscillating mounting for one of the rolls, means for driving the rolls, a cutter, an oscillating member for operating the cutter, controlling mechanism comprising a rotary member, one or more cams adjustably mounted thereon, a cam actuated member arranged to oscillate the movable feed roll mounting, a detent interconnected with the oscillating operating member of the cutter, a cam actuated lever posterior to said cam actuated member and having a member acted on by a cam, a shiftable support for the lever fulcrum, a connection from the work arm of the lever to the cutter operating member, and means for shifting said support and adjusting said connection simultaneously to vary the tab feed and cut off.

65. Tabbing mechanism, comprising tab strip feeding means, a cutter for severing tabs, a rock shaft controlling action of the feeding means, another rock shaft operating the cutter, a rotary controlling disk, one or more cams adjustably secured thereon, a lever having a follower in the path of a cam and connected to oscillate the feed control shaft, another lever having a follower actuated by a cam, means for adjusting said lever, a detent retaining the feed rock shaft in feed position while the cutter is retracted, and a connection from the second lever to oscillate the cutter rock shaft.

66. Tabbing mechanism, comprising tab strip feeding means, a cutter for severing tabs, a rock shaft controlling action of the feeding means, another rock shaft operating the cutter, a rotary controlling disk, one or more cams adjustably secured thereon, a lever having a follower in the path of a cam and connected to oscillate the feed control shaft, another lever having a member actuated by a cam, a swinging fulcrum support for said lever, a reciprocating shifter connected to the lever work arm, means for adjusting said fulcrum support and simultaneously adjusting said lever and shifter connection, a detent retaining the feed rock shaft in feed position when the cutter is retracted, and a connection from said shifter to oscillate the cutter rock shaft, to cut the strip and release the detent.

67. In controlling mechanism for a tabbing machine, a sub-combination comprising an oscillating feed controlling lever, a feed controlling element positioned by said lever, a detent for retaining said element in feed position, a screw shaft mounted for rotation and reciprocation, a shifting collar adjustably secured on the shaft and connected to release the detent when the shaft is reciprocated, a rotatable sleeve having screw engagement with the shaft, a shifting collar on the sleeve, a lever having one end engaging said collar, a movable member on which the lever is fulcrumed, a shiftable block connected to move the lever fulcrum support, a screw for positioning the block, and means actuated by rotary movement of said screw for positioning said sleeve by rotary movement on its screw shaft and thus positioning the end of the lever engaging the collar of said sleeve, a rotary controlling member and one or more cams adjustably mounted on said member and arranged to act successively on the two levers to start and stop the strip to be fed.

68. In controlling mechanism for a tabbing machine, a sub-combination comprising an oscillating feed controlling lever, a feed controlling element positioned by said lever, a detent for retaining said element in feed position, a screw shaft mounted for rotation and reciprocation, a shifting collar adjustably secured on the shaft and connected to release the detent when the shaft is reciprocated, a rotatable sleeve having screw engagement with the shaft, a shifting collar on the sleeve, a lever having one end engaging said collar, a movable member on which the lever is fulcrumed, a shiftable block connected to move the lever fulcrum support, a screw for positioning the block, means actuated by rotary movement of said screw for positioning said sleeve by rotary movement on its screw shaft and thus positioning the end of the lever engaging the collar of said sleeve, a rotary controlling member and one or more cams adjustably mounted on said member and arranged to act successively on the two levers to start and stop the strip to be fed, and a strip cutter operating substantially simultaneously with the releasing movement of said detent.

69. In controlling mechanism for a tabbing machine, a sub-combination comprising an oscillating feed controlling lever, a feed controlling element positioned by said lever, a detent for retaining said element in feed position, a screw shaft mounted for rotation and reciprocation, a shifting collar adjustably secured on the shaft and connected to release the detent when the shaft is reciprocated, a rotatable sleeve having screw engagement with the shaft and a shifting collar on the sleeve, a lever having one end engaging said collar, a movable member on which the lever is fulcrumed, a shiftable block connected to move the lever fulcrum support, a screw for positioning the block, a gear connected to move with the block and turn with the screw, a pinion on said screw-shaft having rotary and sliding engagement with said gear, whereby the end of the lever engaging the collar of said sleeve is positioned in proper relation to the positioning of the lever fulcrum, a rotary controlling member, and one or more cams adjustably mounted on said member and arranged to act successively on the two levers to start and stop the strip to be fed.

70. In controlling mechanism for a tabbing machine, a sub-combination comprising an oscillating feed controlling lever, a feed controlling element positioned by said lever, a detent for retaining said element in feed position, a screw shaft mounted for rotation and reciprocation, a shifting collar adjustably secured on the shaft and connected to release the detent when the shaft is reciprocated, a rotatable-sleeve having screw engagement with the shaft and a shifting collar on the sleeve, a lever having one end engaging said collar, a movable member on which the lever is fulcrumed, a shiftable block connected to move the lever fulcrum support, a screw for positioning the block, a gear connected to move with the block and turn with the screw, a pinion on said screw shaft having rotary and sliding engagement with said gear, whereby the end of the lever engaging the collar of said sleeve is positioned in proper relation to the positioning of the lever fulcrum, a rotary controlling member, one or more cams adjustably mounted on said member and arranged to act successively on the two levers to start and stop the strip to be fed, and a strip cutter operating substantially simultaneously with the releasing movement of said detent.

71. A tabbing machine comprising a frame, a rotary blank platen therein, an adjusting shaft, a driving shaft and a controlling shaft located on the frame parallel to the platen axis, one or more tabbing units laterally adjustable in the frame and in relation to the platen and intersected by said shafts, the adjusting shaft being connected to move said units laterally, the driving shaft having a sliding and rotative engagement with a driving element in said unit and the controlling shaft having a sliding and operative engagement with strip controlling mechanism in said unit, and stationary controlling mechanism on said frame including means for oscillating the controlling shaft in timed relation to rotation of said driving shaft.

72. A tabbing machine comprising a frame, a rotary blank platen therein, two adjusting screw shafts, a driving shaft and two controlling shafts located on the frame parallel to the platen axis, one or more tabbing units laterally adjustable in the frame and in relation to the platen and intersected by said shafts, the adjusting shafts being connected together and also connected to move said units laterally, the driving shaft having a sliding and rotative engagement with a driving element in said unit and the controlling shafts having sliding and operative engagement with strip controlling and cutting mechanism in said unit, and stationary controlling mechanism on said frame including means for oscillating the controlling shaft in adjustably timed relation to rotation of said driving shaft.

73. In tabbing mechanism, an operative unit comprising a tab strip roll holder, means for feeding a strip from the roll, a cutter for severing the strip, a strip retarder operated in connection with the cutter, a rotary applier head carrier, two applier heads spaced apart about the carrier, a gripper on each head, a stationary gripper controlling member, and a gluer arranged to apply glue to tabs supplied to the two grippers by the strip feed and cutting means in one rotation of the applier head carrier.

74. In tabbing mechanism, an operative unit comprising a tab strip roll holder, means for feeding a strip from the roll, a cutter for severing the strip, a strip retarder operated in connection with the cutter, a rotary applier head carrier, two applier heads spaced apart about the carrier, a gripper on each head, a stationary gripper controlling member, a gluer arranged to apply glue to tabs supplied to the two grippers by the strip feed and cutting means in one rotation of the applier head carrier, said gluer being arranged as an operative unit, and means for detachably securing the gluer unit in position.

75. In tabbing mechanism, an operative unit comprising a tab strip roll holder, means for feeding the strip intermittently from the roll holder, a cutter for severing portions from the strip at intervals, a rotary applier head carrier, and at least two applier heads on the carrier spaced apart and arranged to receive two successive tabs from the tab feeding and cutting mechanism during one rotation of the carrier.

76. In tabbing mechanism, an operative unit comprising a tab strip roll holder, means for feeding the strip intermittently from the roll holder, a cutter for severing portions from the strip at intervals, a rotary applier head carrier, at least two applier heads on the carrier spaced apart and arranged to receive two successive tabs from the tab feeding and cutting mechanism during one rotation of the carrier, and gluing mechanism arranged to glue outer faces of the tabs advanced past the gluing mechanism by the applier heads.

77. In tabbing mechanism, a tab gripping and applying unit comprising a rotary applier head carrier, at least two applier heads thereon arranged for adjustment on the carrier and in relation to each other, and a gripper on each applier head.

78. In tabbing mechanism, a tab gripping and applying unit comprising a rotary applier head carrier, at least two applier heads thereon arranged for adjustment on the carrier and in relation to each other, a gripper on each applier head, and means for successively operating the grippers.

79. In tabbing mechanism, a tab gripping and applying unit comprising a rotary applier head carrier, at least two applier heads thereon arranged for adjustment on the carrier and in relation to each other, and a gripper on each applier head, each applier head having an arc-shaped surface adjacent to the gripper to support a trailing portion of a tab.

80. Tabbing mechanism comprising a rotary blank platen, a rotary tab applier head arranged to apply an adhesively conditioned tab to a blank advanced by the platen, means for supplying a tab strip to the head and for severing the strip to form an individual tab, and a pressing roll yieldably pressed against the applied tab to fix it in position as the blank advances on the platen beyond the tab-application point.

Signed at Philadelphia in the county of Philadelphia and State of Pennsylvania this 25th day of February A. D., 1922.

CHARLES H. NITSCH.
WILLIAM A. WEIGHTMAN.
WILLIAM H. STREEPER.